(12) United States Patent
Bendel et al.

(10) Patent No.: US 8,359,362 B2
(45) Date of Patent: Jan. 22, 2013

(54) ANALYZING NEWS CONTENT INFORMATION

(75) Inventors: Timothy J. Bendel, Charlotte, NC (US); Debashis Ghosh, Charlotte, NC (US); David Joa, Irvine, CA (US); Kurt D. Newman, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 200 days.

(21) Appl. No.: 12/824,981

(22) Filed: Jun. 28, 2010

(65) Prior Publication Data

US 2011/0320543 A1 Dec. 29, 2011

(51) Int. Cl.
G06F 15/16 (2006.01)

(52) U.S. Cl. .......................................... 709/206; 709/205

(58) Field of Classification Search .................. 707/943; 455/414.3; 340/7.48; 709/205, 206
See application file for complete search history.

(56) References Cited

U.S. PATENT DOCUMENTS

| | | | |
|---|---|---|---|
| 6,014,134 A * | 1/2000 | Bell et al. ........................ | 715/705 |
| 6,674,357 B1 * | 1/2004 | Bermel .......................... | 340/7.55 |
| 7,720,606 B2 * | 5/2010 | Burfeind et al. .................. | 702/3 |
| 7,899,866 B1 * | 3/2011 | Buckingham et al. ........ | 709/206 |
| 2006/0073812 A1 * | 4/2006 | Punaganti Venkata et al. ........................... | 455/412.1 |
| 2006/0235885 A1 * | 10/2006 | Steele et al. ............... | 707/104.1 |
| 2006/0242158 A1 * | 10/2006 | Ursitti et al. .................... | 707/10 |
| 2008/0077708 A1 * | 3/2008 | Scott et al. .................... | 709/246 |
| 2009/0248678 A1 * | 10/2009 | Okamoto et al. ................. | 707/5 |
| 2010/0131455 A1 * | 5/2010 | Logan et al. .................. | 707/602 |
| 2011/0153414 A1 | 6/2011 | Elvekrog et al. .......... | 705/14.43 |

OTHER PUBLICATIONS

Costantino et al., Natural language processing and information extraction: qualitative analysis of financial news articles., Computational Intelligence for Financial Engineering (CIFEr), 1997., Proceedings of the IEEE/IAFE 1997, Mar. 1997.*
Patent Pending U.S. Appl. No. 11/971,547 entitled *Customer Service Using Speech to Text Analytics*; 34 total pages, filed Jan. 9, 2008.
Patent Pending U.S. Appl. No. 12/824,649 entitled *Electronic Analysis and Processing* in the name of Timothy J. Bendel, et al.; 35 total pages, filed Jun. 28, 2010.
Patent Pending U.S. Appl. No. 12/824,875 entitled *Analyzing Social Networking Information* in the name of Timothy J. Bendel, et al. ; 35 total pages, filed Jun. 28, 2010.
*USPTO; Office Action* for U.S. Appl. No. 12/824,875 in the name of Timothy J. Bendel, et al.; 10 pages, Mar. 16, 2012.

* cited by examiner

*Primary Examiner* — Wing F Chan
*Assistant Examiner* — Kostas Katsikis
(74) *Attorney, Agent, or Firm* — Michael A. Springs

(57) ABSTRACT

In a particular embodiment, a method includes receiving a first electronic data from a first news source, wherein the first electronic data is associated with a particular news event and receiving a second electronic data from a second news source, wherein the second electronic data is associated with the particular news event. The method also includes comparing the first and second electronic data and based on the comparison, assigning a numerical value to at least one of the first and second electronic data. The method further includes based on the numerical value assigned to at least one of the first and second electronic data, generating a third electronic data and transmitting the third electronic data to a user.

27 Claims, 2 Drawing Sheets

ANALYZING NEWS CONTENT INFORMATION

TECHNICAL FIELD OF THE INVENTION

The invention relates generally to information analysis, and more particularly to analyzing news content information.

BACKGROUND OF THE INVENTION

Due to the proliferation and accessibility of information and media, today's information consumer has access to significantly more information than can be easily and quickly digested. News sites, social networking media, and direct personal messages can overwhelm an information consumer's ability to process and comprehend the totality of information available. As a result, significant or important messages may be missed due to the information overload. Additionally, nascent trends present in messages may be obscured by unrelated messages.

With the advent of computers and the Internet, sharing and accessing information on any subject has become easy. For example, if a user wants to develop an understanding on a particular topic, then the user can access various articles, news, blogs, and the like on the Internet. However, due to this ease of sharing of information, the amount of information that has been shared has increased exponentially. For example, a user may need to read comments posted by different users on a social networking website on a particular topic to understand a central idea of a discussion. The overflow of information results in the user re-reading redundant information, thereby wasting time. Surfing through the tremendous amount of data wastes users' efforts and time.

SUMMARY OF THE INVENTION

In accordance with particular embodiments of the present disclosure, the disadvantages and problems associated with analyzing news content information.

In accordance with a particular embodiment of the present disclosure, a method includes receiving a first electronic data from a first news source, wherein the first electronic data is associated with a particular news event and receiving a second electronic data from a second news source, wherein the second electronic data is associated with the particular news event. The method also includes comparing the first and second electronic data and based on the comparison, assigning a numerical value to at least one of the first and second electronic data. The method further includes based on the numerical value assigned to at least one of the first and second electronic data, generating a third electronic data and transmitting the third electronic data to a user.

In accordance with another particular embodiment of the present disclosure, a system includes a memory operable to store a first electronic data from a first news source, wherein the first electronic data is associated with a particular news event and store a second electronic data from a second news source, wherein the second electronic data is associated with the particular news event. The system also includes a processor coupled to the memory and operable to compare the first and second electronic data. The processor is also operable to, based on the comparison, assign a numerical value to at least one of the first and second electronic data. The processor is also operable to, based on the numerical value assigned to at least one of the first and second electronic data, generate a third electronic data. Further, the processor is operable to transmit the third electronic data to a user.

In accordance with yet another particular embodiment of the present disclosure, a non-transitory computer readable medium is encoded with logic, the logic operable, when executed on a processor receive a first electronic data from a first news source, wherein the first electronic data is associated with a particular news event and receive a second electronic data from a second news source, wherein the second electronic data is associated with the particular news event. The logic is further operable to compare the first and second electronic data. The logic is also operable to, based on the comparison, assign a numerical value to at least one of the first and second electronic data. The logic is also operable to, based on the numerical value assigned to at least one of the first and second electronic data, generate a third electronic data, and transmit the third electronic data to a user.

Technical advantages provided by particular embodiments of the present disclosure include reducing the redundancy in voluminous content and presenting the users with the main theme in the voluminous information, thereby saving users time and effort. In addition, particular embodiments prioritize the multiple sources of information and flags new and updated information in a chain of messages, thereby increasing efficiency and further reducing the user's effort and time. This may not only save the user time and effort, but it may also help to determine trends hidden within voluminous amounts of unrelated data. For example, by determining sentiments associated with a large amount of user-generated content, an organization may be able to quickly spot and react to emerging problems within a community. Additionally, particular embodiments can summarize and prioritize any type of voluminous information. For example, it can summarize voluminous research journals having similar content. Upon summarizing a given set of information once, embodiments of the present disclosure provide a user only with the highlights of further updates to the given set of information, thereby saving time and effort. Certain embodiments can provide a comparison between similar news and other content originating from multiple sources. This facilitates the ability of a user to judge the best source of information for a particular subject. Furthermore, some embodiments of the present disclosure facilitate the controlling of a user's workflow by mapping the value of the message with an appropriate agent and routing the message to the mapped agent. This mapping diminishes the manual errors and increases the overall reliability in customer service processes. By providing the user with a central idea along with the priority action items, particular embodiments enable a user to manage his or her time on the action items that have a higher relative priority. Additionally, by assigning a higher relative numerical value to messages received from managers, CEOs, and other important members of an organization, and lower relative numerical values to peers particular embodiments facilitate intelligent filtering and sorting of messages. As a result, particular embodiments of the present disclosure may provide numerous technical advantages. Nonetheless, particular embodiments may provide some, none, or all of these technical advantages, and may provide additional technical advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE INVENTION

Figure 1:
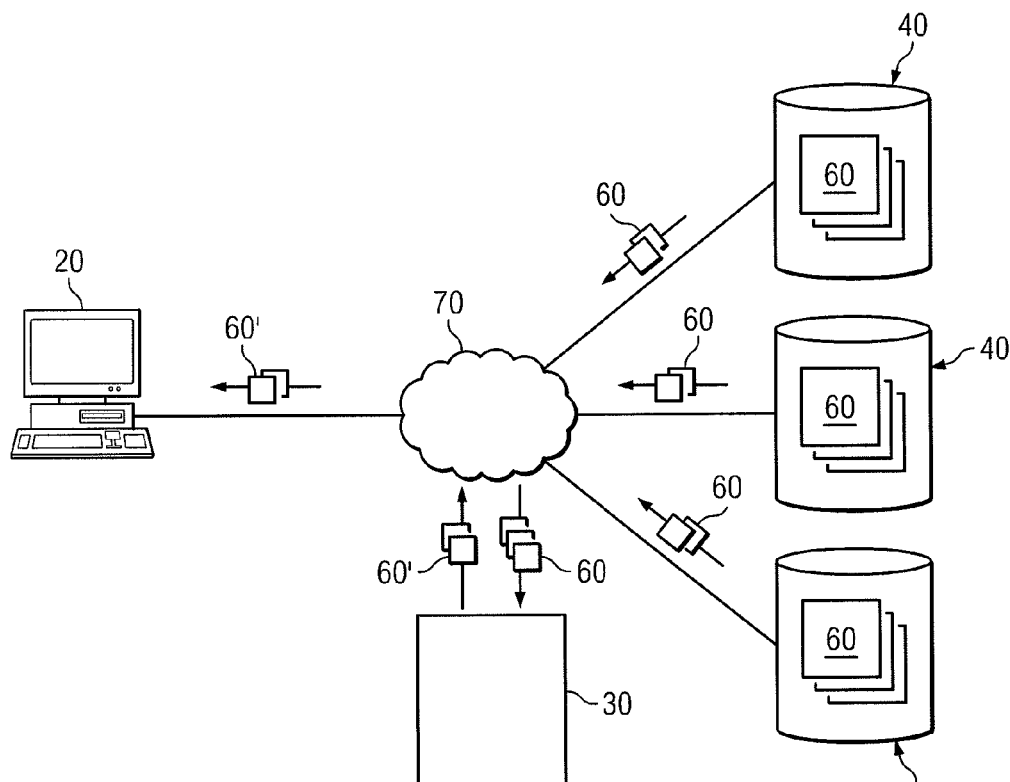
FIG. 1 illustrates components of an information decluttering system according to a particular embodiment.

FIG. 1 illustrates an information decluttering system 10 according to a particular embodiment of the present invention. System 10 includes one or more clients 20, message analyzer 30, data sources 40, and network 50. Message analyzer 30 receives one or more messages 60 from data sources 40, processes messages 60, and, in particular embodiments, may generate message 60' based on the received messages 60. Messages 60, as described further below, may include content and/or information that message analyzer 30 summarizes, filters, sorts, segments, modifies, and/or otherwise processes. As a result, message analyzer 30 may present content provided in messages 60 in a modified form to a user at client 20 to improve the intake of information by the user.

As described further below, message 60 may represent any electronic content suitable for delivery to a user at client 20. For example, message 60 may represent an electronic version of a news story, a message posted on a social networking site, an electronic mail message, a newsgroup posting, and/or any other suitable human-readable content or representations of human-readable content. In the example embodiment in which messages 60 represent news stories, message analyzer 30 may analyze messages 60, select news stories that are similar, and transmit message 60', which represents a summary version of the news story, to a user at client 20. In the example embodiment in which messages 60 represent messages posted on a social networking site, message analyzer 30 may analyze messages 60 to determine whether and/or which messages 60 contain similar content and/or sentiments, and transmit message 60', which represents a summarized version of messages posted on a social networking site, to a user at client 20. In the example embodiment in which messages 60 represent emails, message analyzer 30 may analyzer messages 60 to determine whether and/or which messages 60 contain similar content and/or sentiments, and transmit message 60', which represents a summarized email, to a user at client 20.

Client 20 (each of which may be referred to individually as "client 20" or collectively as "clients 20") receive messages 60 from message analyzer 30. In particular embodiments, clients 20 represent general or special-purpose computers operating software applications capable of performing the above-described operations. For example, clients 20 may include, but are not limited to, laptop computers, desktop computers, portable data assistants (PDAs), cell phones, smart phones, and/or portable media players. In some embodiments, client 20 comprises general-purpose personal computer (PC), a Macintosh, a workstation, a Unix-based computer, a server computer, or any suitable processing device. Additionally, in particular embodiments, client 20 may include one or more processors operable to execute computer logic and/or software encoded on tangible media that performs the described functionality. Client 20 may also include one or more computer input devices, such as a keyboard, trackball, or a mouse, and/or one or more Graphical User Interfaces (GUIs), through which a user may interact with the logic executing on the processor of client 20. In general, however, client 20 may include any appropriate combination of hardware, software, and/or encoded logic suitable to perform the described functionality. Additionally, clients 20 may be connected to or communicate with message analyzer 30 and/or datacenters 20 directly or indirectly over network 70. Clients 20 may couple to network 70 through a dedicated wired or wireless connection, or may connect to network 70 only as needed to receive, transmit, or otherwise execute applications. Although FIG. 1 illustrates, for purposes of example, a particular number of clients 20, alternative embodiments of system 10 may include any appropriate number and type of clients 20.

Message analyzer 30 receives messages 60 from data sources 40 and analyzes messages 60. In an embodiment, message analyzer 30 generates message 60' based on the analysis of messages 60 and transmits message 60' to client 20. In some embodiments, message analyzer 30 generates message 60' based on an analysis of messages 60 and assigns one or more numerical values to message 60 based on the analysis. For example, message analyzer 30 may assign one or more numerical values to message 60 based on: (i) a statistical analysis of words in message 60; (ii) contextual text mining of message 60; (iii) a linguistic analysis of message 60; (iv) a grammar analysis of messages 60; (v) rules-based programming; and/or any other suitable analysis of message 60.

In particular embodiments, a statistical analysis of words in message 60 includes analyzing the frequency and distribution of words in message 60. Contextual text mining of message 60 may include evaluating message 60 in the context of other related messages 60. For example, a particular message 60 may have different meaning depending on other related messages 60. Message analyzer 30 may determine other related messages by performing a linguistic analysis, a grammatical analysis, a word comparison, or by any other suitable method. A linguistic analysis of message 60 may include determining the meaning of message 60. In some embodiments, a linguistic analysis includes a sentiment analysis, requests for actions, and/or other meanings. A grammar analysis of message 60 may include determining a grammatical structure and/or complexity of message 60. rules-based programming; and/or any other suitable analysis of message 60. In particular embodiments, rules based programming includes determining factors associated with the circumstances of message 60. For example, rules-based programming may include assigning a higher relative numerical value to message 60 because message 60 comes from a manager rather than a peer.

Based on the one or more numerical values assigned to messages 60, message analyzer 30 may generate and/or transmit message 60' to client 20. In some embodiments, message analyzer 30 represents a general-purpose PC, a Macintosh, a workstation, a Unix-based computer, a server computer, and/or any suitable processing device. Accordingly, message analyzer 30 may include one or more processors and/or memory to perform the above described functions. Although FIG. 1 illustrates, for purposes of example, a single message analyzer 30, alternative embodiments of information decluttering system 10 may include any appropriate number and type of message analyzers 30 to analyze messages 60 from any suitable data source 40.

Data sources 40 represent data storage devices and/or information services that store, generate, and/or transmit messages 60 to other components of information decluttering system 10. Data sources 40a, 40b, and 40c (each of which may be referred to individually as "data source 40" or collectively as "data sources 40") represent any device and/or service capable of storing, retrieving, generating, transmitting and/or processing any suitable form of electronic data. In particular embodiments, data source 40 represents: (i) an information feed from a news provider and/or aggregator (such as, for example, Google News®, Yahoo! News®, CNN®, an Associated Press® feed, a Reuters® feed, and a Really Simple Syndication service); (ii) an email server (such as, for example, a Microsoft Exchange® server and/or a web-based email service); (iii) a social networking site (such as, for example, Facebook®, Myspace®, LinkedIn® and/or Twitter®); (iv) and/or a newsgroup server (such as, for example, a Usenet sever). Thus, in an example embodiment in which data source 40 represents an information feed from a news provider, message 60 represents an electronic representation of a news story. Message 60 may include a headline, byline, and news story content relating to a particular news event. In an example embodiment in which data source 40 represents an email server, message 60 represents an email. Message 60 may include header information, a message body, and/or attachments. in an example embodiment in which data source 40 represents a social networking site, message 60 may represent a tweet, a status update, a wall posting, a news story, and/or any other relevant information posted to a social networking website. Message 60 may include a sender's user identification, a message, and/or a relevant message categorizer, such as a hash tag. In an example embodiment in which data source 40 represents a newsgroup server, message 60 may represent a message posted to a group stored in the newsgroup server. Message 60 may include a sender's user identification, header information, and/or a message body. Although FIG. 1 illustrates three data sources 40, alternative embodiments of system 10 may include any appropriate number and type of data sources 40.

To facilitate communication among the various components of information decluttering system 10, clients 20, message analyzer 30, and data sources 40 are communicatively coupled via one or more networks 70. For example, messages 60 and messages 60' may be communicated between or among various components of information decluttering system 10 via network 70. Network 70 may represent any number and combination of wireline and/or wireless networks suitable for data transmission. Network 70 may, for example, communicate internet protocol packets, frame relay frames, asynchronous transfer mode cells, and/or other suitable information between network addresses. Network 70 may include one or more intranets, local area networks, metropolitan area networks, wide area networks, cellular networks, all or a portion of the Internet, and/or any other communication system or systems at one or more locations. Although FIG. 1 illustrates for purposes of example a single network 70, particular embodiments of system 10 may include any appropriate number and type of networks 70 that facilitate communication among one or more various components of system 10.

Example operations of information decluttering system 10 will now be described with respect to various embodiments of the present disclosure. Although several example operations in accordance with various embodiments are described below, it should be understood that the present disclosure is intended to encompass other operations and functions not explicitly described. Moreover, the described example embodiments are not necessarily mutually exclusive, and particular embodiments of information decluttering system 10 may perform one or more operations in the same embodiment.

I. Email Processing

In particular embodiments in which information decluttering system 10 receives and processes electronic mail messages, data source 40 represents an email server and messages 60 represent electronic mail messages. Operation begins with client 20 transmitting a request to data source 40 to receive new mail. In some embodiments, data source 40 transmits messages 60 in response to a request for new mail messages from client 20. In other embodiments, data source 40 transmits messages 60 as new electronic mail messages arrive for a particular user or based upon a predetermined schedule.

Upon determining to transmit message 60, data source 40 communicates message 60 to message analyzer 30 for processing. Message analyzer 30 may store message 60, determine one or more characteristics associated with message 60, and/or analyze message 60. Analyzing message 60 may include comparing received message 60 to other messages 60.

Based on the determined characteristics and/or analysis, message analyzer 30 may assign one or more numerical values to message 60. A numerical value may be assigned from any suitable range of values, depending on the particular configuration of information decluttering system 10. Message analyzer 30 may assign a numerical value to message 60 based, at least in part, on a sender and/or receiver in an organization. For example, messages 60 received from a supervisor may receive a numerical indicator that represents a higher priority than messages 60 received from coworkers. As discussed in the following examples, an assigned numerical value may indicate a relative importance of message 60, whether action needs to be taken related to message 60, and/or whether message 60 contains updated, new, and/or different information as compared to previously received messages 60. In some embodiments, a higher numerical value indicates a higher relative trustworthiness of the source of message 60 and/or the distinctiveness of the content of message 60.

Moreover, in particular embodiments of information decluttering system 10, message analyzer 30 may assign more than one numerical values to message 60 based on any relevant analysis performed by message analyzer 30. Each numerical value assigned to message 60 may be based on a different respective characteristic associated with message 60. For example, message analyzer 30 may assign a first numerical value to message 60 based on a sender of message 60, a second numerical value based on a content analysis of message 60, a third numerical value to message 60 based on a linguistic analysis of message 60, and a fourth numerical value to message 60 based on a grammatical analysis of message 60.

Based on the one or more numerical values, information decluttering system 10 may be configured to perform a particular operation with respect to message 60. One or more numerical values may facilitate filtering, sorting, and/or decluttering information received at client 20. For example, information decluttering system 10 may be configured to generate and/or transmit message 60' based on message 60 being assigned one or more numerical values greater than a predetermined threshold. In some embodiments, message analyzer 30 may compare an average numerical value, a highest and/or lowest relative numerical value, and/or any other suitable combination of numerical values to a predetermined threshold. As a result, one or more assigned numerical values may facilitate filtering of messages 60 based on a relative importance. Numerical values may be stored in a memory of message analyzer 30 and associated with a relevant message 60, encoded in message 60 and/or message 60', and/or associated with message 60 and/or message 60' in any suitable manner.

Message analyzer 30 may analyze message 60 using one or more methods, depending on the overall capabilities of information decluttering system 10 and/or the configuration of information decluttering system 10. In particular embodiments, message analyzer 30 may analyze message 60 using a statistical analysis of words in message 60, contextual text mining of message 60, a linguistic analysis of message 60, a grammatical analysis of message 60, rules-based programming, and/or any other suitable analysis of message 60. One or more analyses of message 60 may facilitate the determination of a sentiment associated with message 60. For example, based on a linguistic and/or grammatical analysis of message 60, message analyzer 30 may determine whether the email message represents a positive or negative sentiment toward a recipient and/or organization. In one embodiment, message analyzer 30 may detect one or more predefined words, such as, for example, "hate," "frustrating," "bad," "negative," "terrible," or "never," and determine that the relevant message 60 is associated with a negative sentiment. Message analyzer 30 may detect one or more predefined words, such as, for example, "good," "better," "great," "happy," "positive," "fun," or "pleased" and determine that the relevant message 60 is associated with a positive sentiment. As a result, message analyzer 60 may facilitate sorting, filtering and/or categorizing of messages 60 based on an analysis of a sentiment expressed therein.

In some embodiments, message analyzer 30 may analyze message 60 to determine whether message 60 includes action verbs. For example, message analyzer 30 may detect one or more predefined words, such as, for example, "expedite," "process," "respond," "draft," "send," "examine," "follow up," or "analyze," that indicate an action to be performed by the user. Message analyzer 30 may assign one or more numerical values to message 60 based, at least in part, on detecting one or more action verbs in message 60. In some embodiments, a higher relative numerical value may indicate the importance of the action to be taken with respect to message 60.

Message analyzer 30 may also perform an analysis on message 60 to determine differences in content. For example, a particular message 60 may include content similar to another message 60, such as in the case of email chains that include duplicative or repetitive content. Message analyzer 30 may compare a received message 60 to a subsequent message 60, analyze each message 60 to determine if any new, updated, or different content exists in the subsequent message 60. Based on this differential analysis, message 60 may assign one or more higher relative numerical values to a particular message 60 that includes new, updated, or different content. In some embodiments, the greater the amount of textual differences, the higher the numerical value message analyzer 30 will assign to message 60. Thus, message analyzer 30 may generate and/or transmit message 60' when a particular message 60 is assigned one or more numerical values greater than a respective predetermined threshold. As a result, message analyzer 30 may facilitate selective filtering out of emails that do not include new content, while transmitting emails of a higher relative importance, such as those that include new, updated, or different content.

In particular embodiments, message analyzer 30 may assign and/or reclassify a subject field in a message 60 based on input received from a particular user at client 20. For example, a user may receive a particular message 60 that includes a chain of emails discussing a particular topic. The user at client 20 may edit and/or have edited the subject field of message 60 to one that is more relevant than the current subject field by entering a new subject field. Message analyzer 30 may compare the newly entered subject field to subject fields in related messages 60 to analyze messages 60 for uniqueness, a relative hierarchical position of the user in an organization who changed the subject field, and/or relevancy of the newly entered subject field to the content of messages 60. In some embodiments, message analyzer 30 may display the new subject field to a second user to reclassify message 60 using the new information and allowing the user to rank the accuracy of the newly entered subject field.

At appropriate points during operation, client 20 may generate input associated with a received message 60' and/or message 60. For example, a user at client 20 may record a verbal notation related to a received message 60'. Such a notation may include general thoughts on message 60', actions to be taken with respect to message 60', and/or any other relevant content. A notation may be stored on client 20 and/or message analyzer 30. Message analyzer 30 may subsequently associate a recorded notation with a particular message 60'. If message analyzer 30 receives a subsequent message 60 that includes content similar to message 60' associated with the notation, message analyzer 30 may associate the recorded notation with the subsequently received message 60. In this way, the recorded notation may be associated with each message in a chain of received messages 60. If a user would like to access previously developed ideas about a particular message 60', the user may play back the associated notation when or if a related message 60' is received.

In certain embodiments, message analyzer 30 may transmit message 60' to a particular user at client 20 based on an analysis performed on message 60. For example, message analyzer 30 may facilitate workflow of message 60 to particular users. Message analyzer 30 may receive multiple messages 60 that include similar content. Based on one or more analyses as discussed above, message analyzer 30 may assign the same one or more numerical values to each of the messages 60, determine the subject matter and/or content of the relevant messages 60, and transmit a single message 60' to a predetermined user or users associated with the one or more numerical values and/or content of the relevant messages 60. In this way, message analyzer 30 may facilitate customer service interactions by routing emails to an appropriate agent ranked on experience and tenure to handle situations that are appropriate to the type and severity of problems.

In each of the operations described above, after performing an analysis of message 60, message analyzer 30 may generate message 60'. Message 60' may be based, in whole or in part, on message 60. Message 60' may include relevant portions of message 60 and/or be identical to message 60, and may further indicate that a recipient at client 20 is expected to perform some action associated with message 60. In certain embodiments, message 60' may include one or more of tags associated with message 60'. Tags may be based on an analysis performed by message analyzer 30 and may include one or more keywords. For example, message 60' may include one or more tags comprising a sender's name, one or more subject areas of message 60', a sentiment associated with message 60' (such as, for example, positive, negative, or neutral), and/or any other relevant characteristic of message 60' as determined by message analyzer 30. In particular embodiments, tags may be stored in memory 34 of message analyzer 30 and associated with message 60' and/or attached to message 60'. Based on one or more tags associated with message 60', a user at client 20 may search, sort, filter, or perform any other suitable actions with respect to message 60'.

Message analyzer 30 transmits message 60' to a particular user at client 20. In some embodiments, message 60' and/or relevant portions thereof may be highlighted, flagged, placed at the top of user's inbox, or otherwise specially denoted in order to indicate a relative importance of the message 60'. In some embodiments, message analyzer 30 may store message 60' and transmit or retransmit message 60' to a particular client 20 at predetermined intervals. As a result, a user at client 20 may be reminded to take action related to the message 60'.

II. News Content Processing

In particular embodiments in which information decluttering system 10 receives and processes news stories, data source 40 represents a news content source and/or aggregator, and messages 60 represent an electronic representation of a news story associated with a particular news event. In general, there may be multiple news stories transmitted and/or stored by data source 40 associated with a particular news event, such as for example, an environmental disaster or an election for political office. Information decluttering system 10 facilitate summarizing the various news stories associated with a news event and/or transmitting selected news stories that contain updated, new, and/or different content. Based on an analysis of message 60, message analyzer 30 may generate and/or transmit message 60' to client 20. Message 60' may summarize message 60 into a single message 60' and/or transmit a message 60' containing only new, updated, and/or different content to client 20.

Operation begins with client 20 transmitting a request to data source 40 for a news story. Client 20 may transmit the request by entering an appropriate key word search in a web browser and/or other suitable interface to client 20. In some embodiments, data source 40 transmits messages 60 in response to a request for news stories from client 20. In other embodiments, data source 40 transmits messages 60 as news stories are generated or based upon a predetermined schedule. In some embodiments, message analyzer 30 may be configured to request news stories from data sources 40. For example, message analyzer 30 may be configured as a web crawler that searches for relevant news stories based on keywords entered by a user. Message analyzer 30 may determine when relevant news stories are generated by data sources 40. Once received, message analyzer 30 may perform an analysis of the received news stories prior to transmitting message 60' to client 20.

In certain embodiments, message analyzer 30 analyzes messages 60 by comparing first message 60 to a second message 60 to determine whether the messages 60 include similar elements. Message analyzer 30 may utilize one or more of the methods of analysis described above with respect to processing emails in an analogous manner including, but not limited to, linguistic and grammatical analysis. If messages 60 include common elements, message analyzer 30 may generate message 60' that includes the common elements, and transmit message 60' to client 20. As a result, message analyzer 30 may transmit a summarized representation of the relevant news event to a user at client 20, thus relieving the user from reading multiple news stories regarding the same news event that include similar content.

In some embodiments, message analyzer 30 may assign one or more numerical values to message 60 based, at least in part, on a relative completeness of the story as compared with other messages 60 containing similar content. For example, a first message 60 may include details regarding the time, place, and type of accident that occurred, while a second message 60 may include those details and additional details regarding the number of injured, a name of a person at fault, and/or the status of a criminal prosecution. As a result, message analyzer 30 may assign a higher one or more numerical values to the message 60 that includes more complete content—in this case the second message 60. Message analyzer 30 then transmits message 60' based on message 60 having a higher relative one or more numerical values. In particular embodiments, message analyzer 30 may be configured to transmit any message 60' based on a message 60 that is assigned one or more numerical values greater than a respective predetermined threshold.

In certain embodiments, as new messages 60 are received at message analyzer 30, message analyzer 30 compares the new message 60 to stored messages 60 by performing one or more of the analyses described above, to determine if the new messages 60 include any new, updated, or different content associated with the same news event. If a message 60 includes new, updated, or different content associated with the same news event, message analyzer 30 may generate message 60' that includes the new, updated, or different content. Message analyzer 30 may transmit only the new, updated, or different content in message 60', or may highlight the new, updated, or different content in message 60'. As a result, a user interested in a particular topic may receive updated information to a news story, without having to read content with which the user is already familiar.

In some embodiments, it may be desirable to differentiate between news stories and opinion or commentary regarding a particular topic in which a user is interested. Thus, message analyzer 30 may perform a linguistic and/or grammatical analysis on message 60 to determine whether a particular message 60 includes factual or opinion information. Moreover, message analyzer 30 may determine the source of a particular message 60 to facilitate determining whether a particular message 60 is fact or opinion. For example, messages 60 that originate from editorial pages and/or blogs are more likely to be opinion or commentary. If a user is interested in opinion or commentary, message analyzer 30 may be configured to assign higher one or more numerical values to messages 60 received from data sources 40 that provide opinion or commentary. If a user is interested in factual information, message analyzer 30 may be configured to assign higher one or more relative numerical values to message 60 received from data sources 40 that provide news stories.

Moreover, in particular embodiments of information decluttering system 10, message analyzer 30 may assign more than one numerical values to message 60 based on any relevant analysis performed by message analyzer 30. Each numerical value assigned to message 60 may be based on a different respective characteristic associated with message 60. For example, message analyzer 30 may assign a first numerical value to message 60 based on whether message 60 represents fact or opinion, a second numerical value based on a content analysis of message 60, a third numerical value to message 60 based whether message 60 include new, updated, or more complete information, and a fourth numerical value to message 60 based on a grammatical analysis of message 60.

Once message 60' is received at client 20, client 20 may display message 60' on a display associated with client 20. For example, message 60' may represent an electronic representation of a news story, and client 20 may display message 60' by utilizing a web browser, a news reader, an RSS reader, and/or any other suitable method, device and/or software application.

III. Social Networking Content Processing

In particular embodiments in which information decluttering system 10 receives and processes messages from a social network website, data source 40 represents a social networking website, and messages 60 represent text-based messages generated by users of the social networking website. For example, data source 40 may represent Facebook® and/or Myspace®, on which it is possible for users of the respective website to post short messages indicating a status of the user, a note posted by the user, a sentiment expressed by the user, and/or any kind of text-based message. Data source 40 may also represent the social networking site Twitter®, on which users write short text-based messages, known as Tweets®, on a wide variety of topics. In such cases. messages 60 may represent any text-based message generated by a user of such social networking websites.

Message analyzer 30 may be configured as a web crawler that searches for messages 60 based on keywords entered by a user of information decluttering system 10. Thus, message analyzer 30 may retrieve and store text-based messages 60 for later searching, or may search text-based messages 60 for relevant keywords in real time. As one example, a user may enter the name of a relevant organization into an interface of message analyzer 30 and/or client 20, to find all text-based messages that include the name of the relevant organization.

In certain embodiments, message analyzer 30 determines one or more characteristics associated with message 60. Characteristics of message 60 may include a sender and/or user that generated message 60, a number of social connections a user that generated message 60 has on a relevant social networking website, a relevant keyword included in message 60 (such as, for example, in the case of Twitter®, a hash tag included in a Tweet®), a similarity to other messages 60, a number of messages 60 generated by a particular user of a relevant social networking website, a sentiment expressed in message 60, and/or any other relevant characteristics associated with message 60.

Based on the determined characteristics, message analyzer 30 may assign one or more numerical values to messages 60. For example, messages 60 generated by a user with a relatively large number of social connections on data source 40 may be assigned relatively higher one or more numerical values compared to users with fewer social connections on data source 40. Similarly, messages 60 generated by a user with a history of generating messages 60 on a particular topic may be assigned higher relative one or more numerical values when message analyzer 30 determines that message 60 generated by the particular user relates to a particular topic. Further, message analyzer 30 may determine a sentiment expressed by message 60 using one or more of the types of analyses discussed above. Message analyzer 60 may assign higher relative one or more numerical values to message 60 based on a positive or negative sentiment expressed in message 60 or based on the configuration of information decluttering system 10.

In certain embodiments, message analyzer 30 may compare a first message 60 to one or more second messages 60. Message analyzer 30 compares the first message 60 to second messages 60 by performing one or more of the analyses described above to determine if the second messages 60 include content similar to or include elements in common with the first message 60. If a second message 60 includes similar content compared with the first message 60, message analyzer 30 may assign a relatively lower one or more numerical values to the second message 60. As a result, message analyzer 60 may assign relatively lower one or more numerical values to messages 60 that contain similar and/or redundant information compared to first message 60. Message analyzer 30 may generate message 60' based on first message 60 and/or second messages 60. Message 60' may include a summarized representation of messages 60.

For example, a particular organization may be concerned with Twitter® users expressing negative sentiments about the organization. Information decluttering system 10 may be configured to search for Tweets® that express negative sentiments, and present a summarized message 60' to a user at client 20. Numerous Tweets may express dissatisfaction with a particular aspect of an organization's service. Thus message 60' may state simply "[The particular aspect] is unsatisfactory." As a result, a user at client 20 avoids the need to view messages 60 that include the same or similar content, while nevertheless being informed about sentiment among users of the social networking website. Thus, an organization is able to take proactive steps to remedy the dissatisfaction among the social networking website's user base.

Moreover, in particular embodiments of information decluttering system 10, message analyzer 30 may assign more than one numerical values to message 60 based on any relevant analysis performed by message analyzer 30. Each numerical value assigned to message 60 may be based on a different respective characteristic associated with message 60. For example, message analyzer 30 may assign a first numerical value to message 60 based on the number of social connections a sender of message 60 has on data source 40, a second numerical value based on a content analysis of message 60, a third numerical value to message 60 based a sentiment of message 60, and a fourth numerical value to message 60 based on a similarity to other messages 60.

Message analyzer 30 may further generate and/or transmit message 60' to client 20 based, at least in part, on the assigned one or more numerical values. For example, message analyzer 30 may be configured to generate and/or transmit message 60' based on message 60 being assigned one or more numerical values greater than a predetermined threshold. In some embodiments, message analyzer 30 may compare an average numerical value, a highest and/or lowest relative numerical value, and/or any other suitable combination of numerical values to a predetermined threshold. In some embodiments, message 60' is based, at least in part, on message 60. Message 60' may include all or a portion of message 60. Once received at client 20, client 20 may display message 60' on a display associated with client 20. As a result, a user at client 20 may receive only relevant and/or desirable text-based messages generated by users of social networking websites.

Particular embodiments of the present disclosure may provide numerous operational benefits, including reducing the redundancy in voluminous content and presenting the users with the main theme in the voluminous information, thereby saving users time and effort. In addition, information decluttering system 10 prioritizes the multiple sources of information and flags new and updated information in a chain of messages, thereby increasing efficiency and further reducing the user's effort and time. This may not only save the user time and effort, but it may also help to determine trends hidden within voluminous amounts of unrelated data. For example, by determining sentiments associated with a large amount of user-generated content, an organization may be able to quickly spot and react to emerging problems within a community. Additionally, information decluttering system 10 can summarize and prioritize any type of voluminous information. For example, it can summarize voluminous research journals having similar content. Upon summarizing a given set of information once, information decluttering system 10 provides a user only with the highlights of further updates to the given set of information, thereby saving time and effort. Information decluttering system 10 can provide a comparison between similar news and other content originating from multiple sources. This facilitates the ability of a user to judge the best source of information for a particular subject. Furthermore, information decluttering system 10 facilitates the controlling of a user's workflow by mapping the value of the message with an appropriate agent and routing the message to the mapped agent. This mapping diminishes the manual errors and increases the overall reliability in customer service processes. By providing the user with a central idea along with the priority action items, information decluttering system 10 enables a user to manage his or her time on the action items that have a higher relative priority. Additionally, by assigning a higher relative numerical value to messages received from managers, CEOs, and other important members of an organization, and lower relative numerical values to peers particular embodiments facilitate intelligent filtering and sorting of messages. As a result, system 10 may provide numerous operational benefits. Nonetheless, particular embodiments may provide some, none, or all of these operational benefits, and may provide additional operational benefits.

Modifications, additions, or omissions may be made to information decluttering system 10 without departing from the scope of the present disclosure. For example, when a component of information decluttering system 10 determines information, the component may determine the information locally or may receive the information from a remote location. As another example, in the illustrated embodiment, client 20, message analyzer 30, and data servers 40 are represented as different components of information decluttering system 10. However, the functions of client 20, message analyzer 30, and data servers 40 may be performed by any suitable combination of one or more servers or other components at one or more locations. In the embodiment where the various components are servers, the servers may be public or private servers, and each server may be a virtual or physical server. The server may include one or more servers at the same or at remote locations. Also, client 20, message analyzer 30, and data servers 40 may include any suitable component that functions as a server. Additionally, information decluttering system 10 may include any appropriate number of client 20, message analyzer 30, and data servers 40. Any suitable logic may perform the functions of information decluttering system 10 and the components within information decluttering system 10.

Figure 2:
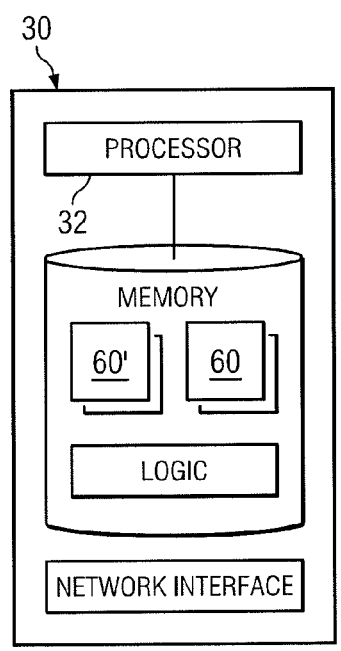
FIG. 2 illustrates an information analyzer from FIG. 1 in more detail, in accordance with particular embodiments of the present disclosure.

FIG. 2 is a block diagram illustrating aspects of message analyzer 30 discussed above with respect to FIG. 1. As discussed above, message analyzer 30 receives message 60, determines one or more characteristics associated with message 60, assigns one or more numerical values to message 60, and generates message 60' based, at least in part, on message 60 and/or the assigned one or more numerical values. Message analyzer 30 includes processor 32, memory 34, message analysis module 35, logic 36, and network interface 38.

Message analyzer 30 comprises any suitable combination of hardware and/or software implemented in one or more modules to provide the described functions and operations. In some embodiments, message analyzer 30 may comprise a general-purpose personal computer (PC), a Macintosh, a workstation, a Unix-based computer, a server computer, or any suitable processing device. In some embodiments, the functions and operations described above may be performed by a pool of multiple message analyzers 30.

Memory 34 comprises any suitable arrangement of random access memory (RAM), read only memory (ROM), magnetic computer disk, CD-ROM, or other magnetic or optical storage media, or any other volatile or non-volatile memory devices that store one or more files, lists, tables, or other arrangements of information such as message 60, message 60', and/or one or more numerical values associated with message 60. Although FIG. 2 illustrates memory 34 as internal to message analyzer 30, it should be understood that memory 34 may be internal or external to message analyzer 30, depending on particular implementations. Memory 34 may be separate from or integral to other memory devices to achieve any suitable arrangement of memory devices for use in information decluttering system 10.

Memory 34 is further operable to store logic 36. Logic 36 generally comprises rules, algorithms, code, tables, and/or other suitable instructions for receiving, storing, generating, and/or transmitting message 60 and/or message 60'. Logic 36 also comprises instructions for determining characteristics associated with message 60 and/or analyzing message 60 for contextual information, including: (i) a statistical analysis of words in message 60; (ii) contextual text mining of message 60; (iii) a linguistic analysis of message 60; (iv) a grammatical analysis of message 60; (v) rules-based programming; and/or any other suitable type of analysis.

Memory 34 is communicatively coupled to processor 32. Processor 32 is generally operable to execute logic 36 to receive message 60, determine characteristics associated with message 60, analyze message 60 for contextual information, assign one or more numerical values to message 60, generate message 60' and transmit message 60' to client 20. Processor 32 comprises any suitable combination of hardware and software implemented in one or more modules to provide the described function or operation.

Network interface 38 communicates information with network 70. For example, network interface 38 receives message 60 form data source 40 through network 70. As another example, network interface 38 communicates message 60' to clients 20 through network 70. Network interface 38 represents any port or connection, real or virtual, including any suitable hardware and/or software that enables message analyzer 30 to exchange information with network 70, client 20, data source 40, and/or or other components of information decluttering system 10.

Figure 3:
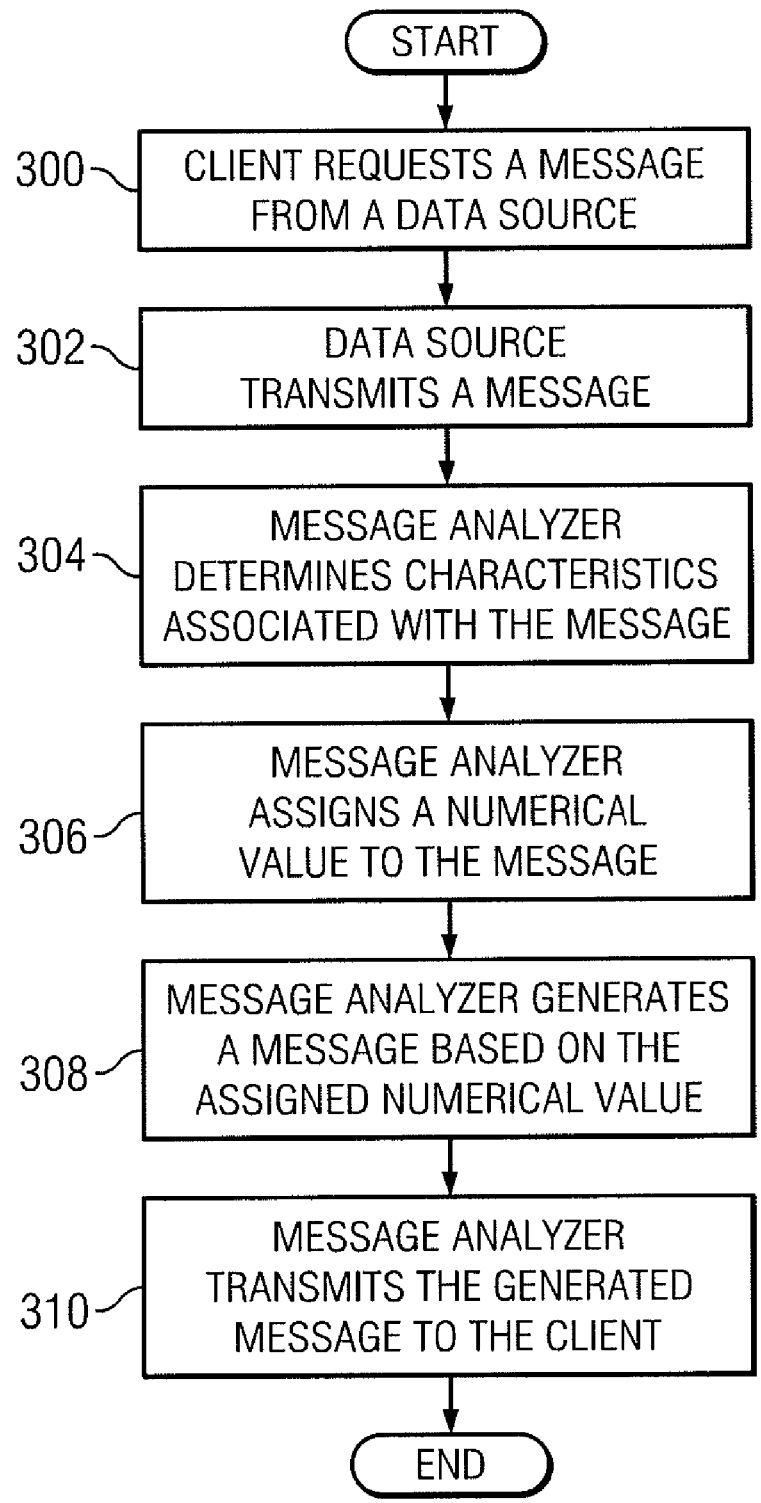
FIG. 3 is a flow chart illustrating a particular operation of the information decluttering system of FIG. 1 in accordance with particular embodiments of the present disclosure.

FIG. 3 is a flow diagram illustrating an operation of information decluttering system 10 in accordance with a particular embodiment. It should be understood that the flow diagram illustrated in FIG. 3 represents one example of an operation that may be performed in a particular embodiment of information decluttering system 10. Information decluttering system 10 may perform other operations in accordance with particular embodiments of the present disclosure.

Operation, in the illustrated example, begins at step 300 with client 20 requesting message 60 from data source 40. A request for message 60 may comprise performing a search via a web browser for a particular news story using keywords, requesting new electronic mail, performing a search of electronic messages generated by users of a social networking website, subscribing to an RSS feed, and/or any other suitable request for electronic information.

At step 302, data source 40 transmits message 60 in response to receiving the request for information. As discussed above, message 60 may represent any electronic content suitable for delivery to a user at client 20. For example, message 60 may represent an electronic representation of a news story, an electronic message generated by a user of and posted to a social networking site, an electronic mail message, a newsgroup posting, and/or any other suitable human-readable content or representations of human-readable content. In particular embodiments, data source 40 transmits message 60 to message analyzer 30.

At step 304, message analyzer 30 receives message 60. Message analyzer 30 may determine one or more characteristics associated with message 60, including, but not limited to, a sender and/or user that generated message 60, a number of social connections a user that generated message 60 has on a relevant social networking website, a relevant keyword included in message 60 (such as, for example, in the case of Twitter, a hash tag included in a Tweet), a similarity to other messages 60, a number of messages 60 generated by a particular user of a relevant social networking website, a sentiment expressed by message 60, and/or any other relevant characteristics associated with message 60. In some embodiments, message analyzer 30 may determine one or more characteristics associated with message 60 by performing a statistical analysis of words in message 60, by performing contextual text mining of message 60, by performing a linguistic analysis of message 60, by performing a grammatical analysis of message 60, by performing rules-based programming and/or by performing any other suitable analysis of message 60.

At step 306, message analyzer 30 assigns one or more numerical values to message 60 based on the determined characteristics. In general, one or more numerical values may indicate a relative priority of message 60. Message analyzer 30 may assign one or more numerical values to message 60 in accordance with any predetermined configuration. For example, message analyzer 30 may assign one or more higher numerical values to messages 60 that contain new, updated, or different content. Message analyzer 30 may assign a higher numerical value to messages 60 sent from an important member of an organization compared to message 60 sent from a peer or a lower-ranked member of an organization. Message analyzer 30 may assign one or more higher relative numerical values to messages 60 that contain words indicating a predetermined sentiment (such as, for example, a positive sentiment or a negative sentiment). Message analyzer 30 may assign higher relative one or more numerical values to messages 60 associated with a sender that has a predetermined number of connections on a social networking website (such as, for example, friends on Facebook® and/or followers on Twitter®).

At step 308, based on the assigned one or more numerical values, message analyzer 30 generates message 60'. Message 60' may include all or a portion of message 60, and may include indications of an importance of message 60'. For example, in embodiments in which message 60' represents an email message, particular portions of message 60' may be highlighted, bolded, or otherwise denoted as relatively important. In embodiments in which message 60' represent a news story, particular portions of message 60' that represent new, updated, or different content may be highlight, bolded, or otherwise denoted to indicate new, updated, or different content.

At step 310, message analyzer 30 transmits message 60' to client 20. Client 20 may display message 60' on a display associated with client 20. In particular embodiments, depending on the value assigned to message 60' client 20 may perform additional actions regarding message 60'. For example, in embodiments in which message 60' represents an email client 20 may display message 60' in a prioritized position within an email reader. In embodiments in which message 60' represents a news story, client 20 may display message 60' in a prioritized position within a news reader and/or web browser.

The steps illustrated in FIG. 3 may be combined, modified, or deleted where appropriate, and additional steps may also be added to those shown. Additionally, the steps may be performed in any suitable order without departing from the scope of the present disclosure.

Although the present disclosure has been described with several embodiments, numerous changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A method, comprising:
   receiving first electronic data from a first news source, wherein the first electronic data is associated with a particular news event;
   receiving second electronic data from a second news source, wherein the second electronic data is associated with the particular news event;
   comparing the first and second electronic data, the comparison comprising identifying any common elements in the first electronic data and the second electronic data;
   based on the comparison, assigning a numerical value to at least one of the first and second electronic data, wherein the numerical value indicates a relative completeness of information about the particular news event contained in the at least one of the first and second electronic data;
   based on the numerical value assigned to at least one of the first and second electronic data, generating third electronic data;
   transmitting the third electronic data to a user.

2. The method of claim 1, wherein the numerical value is a first numerical value and further comprising assigning a second numerical value to at least one of the first and second electronic data.

3. The method of claim 1, wherein generating the third electronic data comprises generating a summary of the first electronic data and the second electronic data that includes the common elements.

4. The method of claim 1, wherein comparing the first and second electronic data further comprises identifying difference elements, difference elements being information included in the first electronic data that is not included in the second electronic data.

5. The method of claim 4, wherein generating the third electronic data comprises generating the third electronic data that includes the difference elements.

6. The method of claim 1, further comprising:
   determining whether the first news source or the second news source generates fourth electronic data associated with the news event; and
   based on the determination, receiving the fourth electronic data.

7. The method of claim 1, wherein comparing the first and second electronic data comprises applying a selected one of linguistic and grammatical analysis to the first electronic data and the second electronic data.

8. The method of claim 1, wherein the numerical value is a first numerical value and further comprising assigning a second numerical value to at least one of the first and second electronic data based on a determination of whether the at least one of the first and second electronic data represents factual information or opinion information.

9. The method of claim 8, wherein the determination is based at least in part on identifying the news source of the at least one of the first and second electronic data.

10. A system, comprising:
    a memory operable to:
      store first electronic data received from a first news source, wherein the first electronic data is associated with a particular news event; and
      store second electronic data received from a second news source, wherein the second electronic data is associated with the particular news event; and
    a processor coupled to the memory and operable to:

compare the first and second electronic data, the comparison comprising identifying any common elements in the first electronic data and the second electronic data;
based on the comparison, assign a numerical value to at least one of the first and second electronic data, wherein the numerical value indicates a relative completeness of information about the particular news event contained in the at least one of the first and second electronic data;
based on the numerical value assigned to at least one of the first and second electronic data, generate third electronic data; and
transmit the third electronic data to a user.

11. The system of claim 10, wherein the processor is operable to compare the first and second electronic data by identifying difference elements, difference elements being information included in the first electronic data that is not included in the second electronic data.

12. The system of claim 11, wherein the processor is operable generate the third electronic data by generating third electronic data that includes the difference elements.

13. The system of claim 10, wherein the processor is further operable to:
determine whether the first news source or the second news source generates fourth electronic data associated with the news event; and
wherein the memory is operable to, based on the determination, store the fourth electronic data.

14. The system of claim 10, wherein the processor is operable to compare the first and second electronic data by applying a selected one of linguistic and grammatical analysis to the first electronic data and the second electronic data.

15. The system of claim 10, wherein:
the numerical value is a first numerical value; and
the processor is operable to assign a second numerical value to at least one of the first and second electronic data based on a determination of whether the at least one of the first and second electronic data represents factual information or opinion information.

16. The system of claim 15, wherein the determination is based at least in part on identifying the news source of the at least one of the first and second electronic data.

17. The system of claim 10, wherein the processor is operable to generate the third electronic data by generating a summary of the first electronic data and the second electronic data that includes the common elements.

18. The system of claim 10, wherein:
the numerical value is a first numerical value; and
the processor is operable to assign a second numerical value to at least one of the first and second electronic data.

19. A non-transitory computer readable medium encoded with logic, the logic operable, when executed on a processor to:
receive first electronic data from a first news source, wherein the first electronic data is associated with a particular news event;
receive second electronic data from a second news source, wherein the second electronic data is associated with the particular news event;
compare the first and second electronic data, the comparison comprising identifying any common elements in the first electronic data and the second electronic data;
based on the comparison, assign a numerical value to at least one of the first and second electronic data, wherein the numerical value indicates a relative completeness of information about the particular news event contained in the at least one of the first and second electronic data;
based on the numerical value assigned to at least one of the first and second electronic data, generate third electronic data; and
transmit the third electronic data to a user.

20. The non-transitory computer readable medium of claim 19, wherein the logic is operable to compare the first and second electronic data by applying a selected one of linguistic and grammatical analysis to the first electronic data and the second electronic data.

21. The non-transitory computer readable medium of claim 19, wherein the logic is operable to generate a third electronic data by generating a summary of the first electronic data and the second electronic data that includes the common elements.

22. The non-transitory computer readable medium of claim 19, wherein the logic is operable to compare the first and second electronic data by identifying difference elements, difference elements being information included in the first electronic data that is not included in the second electronic data.

23. The non-transitory computer readable medium of claim 22, wherein the logic is operable to generate the third electronic data by generating third electronic data that includes the difference elements.

24. The non-transitory computer readable medium of claim 19, wherein the processor is further operable to:
determine whether the first news source or the second news source generates fourth electronic data associated with the news event; and
wherein the memory is operable to, based on the determination, store the fourth electronic data.

25. The non-transitory computer readable medium of claim 19, wherein:
the numerical value is a first numerical value; and
the logic is operable to assign a second numerical value to at least one of the first and second electronic data based on a determination of whether the at least one of the first and second electronic data represents factual information or opinion information.

26. The non-transitory computer readable medium of claim 25, wherein the determination is based at least in part on identifying the news source of the at least one of the first and second electronic data.

27. The non-transitory computer readable medium of claim 19, wherein:
the numerical value is a first numerical value; and
the logic is operable to assign a second numerical value to at least one of the first and second electronic data.

* * * * *